UNITED STATES PATENT OFFICE.

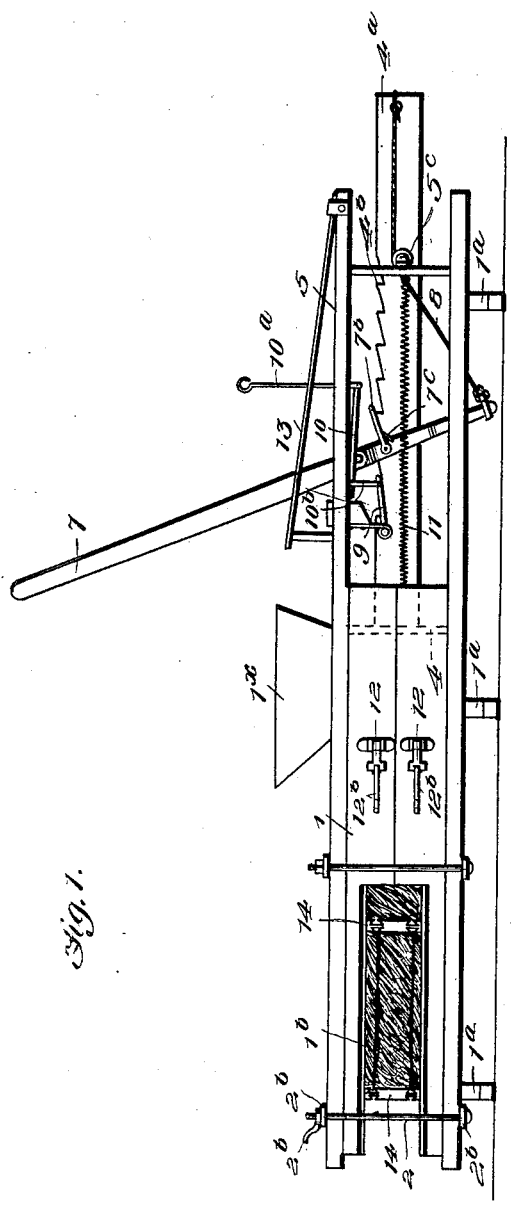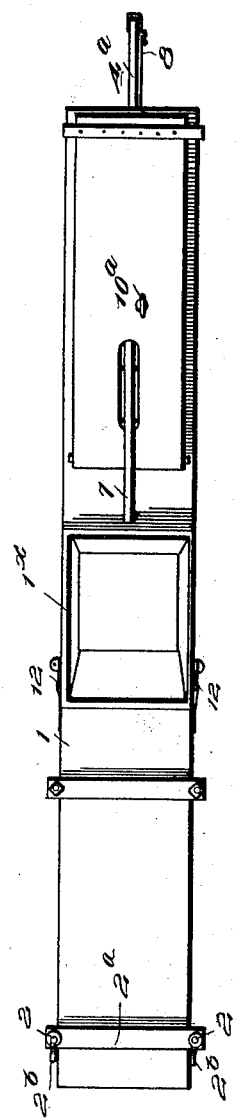

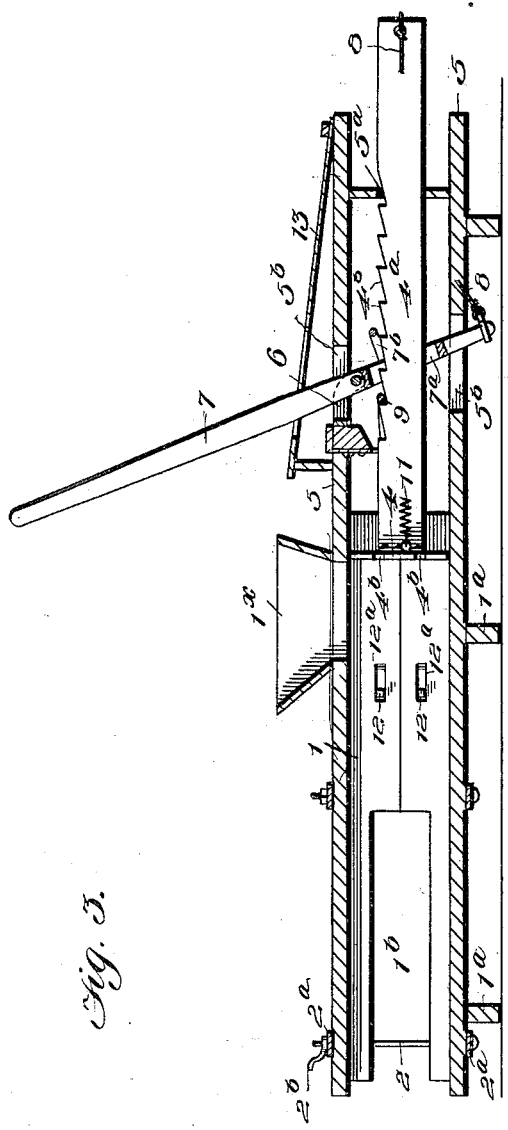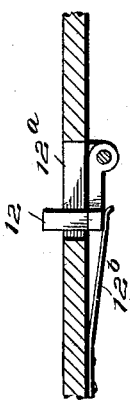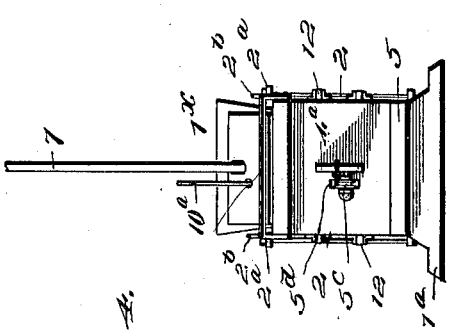

EDWARD W. HILLIARD AND HENRY HEIDACKER, OF METROPOLIS CITY, ILLINOIS.

BALING-PRESS.

SPECIFICATION forming part of Letters Patent No. 701,039, dated May 27, 1902.

Application filed January 24, 1902. Serial No. 91,103. (No model.)

*To all whom it may concern:*

Be it known that we, EDWARD W. HILLIARD and HENRY HEIDACKER, citizens of the United States, residing at Metropolis City, in the county of Massac and State of Illinois, have invented certain new and useful Improvements in Baling-Presses; and we do hereby declare the following to be a full, clear, and exact description of the invention, such as will enable others skilled in the art to which it appertains to make and use the same.

Our invention relates to improvements in baling-presses, and particularly to that class thereof which are operated by hand. Its object is to provide a device for baling hay or other material which will form the bales and continuously automatically discharge them.

In the accompanying drawings, illustrating the preferred embodiment of our invention, Figure 1 is a side elevation. Fig. 2 is a plan view. Fig. 3 is a longitudinal section. Fig. 4 is an end view, and Fig. 5 is a detail sectional view showing more particularly one of the retainers.

In carrying out our invention we provide a packing-box 1, suitably mounted upon supports $1^a$ and having openings $1^b$ in its sides at the discharge end to admit wires for tying the bales and providing for contracting the discharge end, and a hopper $1^\times$ above an opening in the top at its opposite end. At the extreme end on the outside are two rods or bolts 2, connecting plates or bars $2^a$ upon the top and bottom of the packing-box. The upper ends of these rods or bolts are screw-threaded, and levers $2^b$, which bear upon the upper plate, are adapted to be turned thereon to contract the opening between the top and bottom of the discharge end of the box. A plunger 4, which reciprocates within the packing-box, has a rearwardly-extended bar $4^a$, having a series of teeth $4^b$ and is passed through a slot $5^a$ in the end of a frame or support 5. To the upper portion of this frame is secured a preferably bifurcated bracket 6, within which is pivoted a lever 7, having a slot $7^a$, through which passes the bar $4^a$. Suitable openings $5^b$ are provided in the frame 5 to permit movement of the lever 7, and over a pulley $5^c$, mounted in a slot $5^d$ in the end of the frame, passes a cable 8, connected to the lower end of the lever and to the rear end of the bar $4^a$. Pivoted to the lever is a link $7^b$, and upon this lever is a pin $7^c$, adapted to engage said link and raise or withdraw it from the teeth when the upper end of said lever is swung forward. Also adapted to engage said teeth is another link 9, pivoted to the frame and which may be released from the teeth by raising a lever 10, which is pivoted to the frame 5. This lever has a handle $10^a$ and is connected to the link 9 by a pitman $10^b$. A preferably coiled spring 11 is connected, preferably at opposite ends, to the head of the plunger and the rear of the frame to withdraw the plunger after it has been moved forward, when the links are released from the teeth. The head of the plunger 4 is provided with recesses $4^b$ upon its working face to permit retainers 12 to pass in behind the material which has been pressed and hold the same after the plunger has been withdrawn. These retainers 12 are pivoted in slots $12^a$ in the sides of the packing-box and are forced inwardly by preferably flat springs $12^b$, secured to the box and having their free ends bearing upon the free ends of the retainers. Above the frame is arranged a suitable platform 13 for the operator.

In operation the handle of the lever is first drawn back, which pulls the cable 8 and sends the plunger forward to compact the loose hay or other material supplied through the hopper $1^\times$. The link 9 will fall into the teeth of the bar $4^a$ and hold the plunger forward when the lever is released. After the lever is released and thrown forward the cable 8 is slack. The link $7^b$ will now catch the teeth and send the plunger forward until the retainers 12 fall in the notches in the head of the plunger behind the pressed material by moving the lever back and forth. The plunger may now be withdrawn to admit material for another bale. This is done by throwing the lever forward until the pin $7^c$ engages the link $7^b$ and raises it from the teeth of the bar $4^a$. Then the link 9 is released by raising the lever 10, whereby the plunger is withdrawn by the coil-spring 11.

To separate the bales one from another, slotted blocks 14, as shown, are inserted in the packing-box next to the head of the plunger before it is sent forward to press a bale. When the bales are opposite the open sides of the packing-box, they are tied by wire or other means being passed through the slots in the blocks and around the bales. Contracting the openings in the discharge end will retard the forward movement of the bales, and thus the compactness to which the hay is pressed may be regulated.

In our device the loose material is compacted ready to be pressed into a complete bale by one movement of the lever. Then the necessary power to press the material into a compact bale is applied by moving the lever back and forth several times. It is obvious that our construction requires but a minimum number of movements of the lever to press a bale.

It will be understood that we herein describe a practical and preferred embodiment of a machine for carrying out our invention; but it should be understood that we do not limit ourselves to the particular mechanism shown, as we are aware that changes in the details of construction may be made without departing from the spirit or impairing the advantages of our invention.

It is obvious that in lieu of the frame 5 fixtures or other supports may be provided for the lever 7 and bar 4ª.

Having thus described our invention, what we claim as new, and desire to secure by Letters Patent, is—

1. In a baling device, the combination of a packing-box, a plunger, adapted to reciprocate therein, having a bar provided with teeth, a frame, a lever fulcrumed to said frame and connected to said plunger by a cable, and a link pivoted to said lever and adapted to engage said teeth, substantially as set forth.

2. In a baling device, the combination of a packing-box, a plunger adapted to reciprocate therein, having a bar provided with teeth, a frame, a lever fulcrumed to said frame and connected to said plunger by a cable, a link pivoted to said lever adapted to engage said teeth, and a second link pivoted to said frame and adapted to also engage said teeth, substantially as set forth.

3. In a baling device, the combination of a packing-box, a plunger adapted to reciprocate therein, having a bar provided with teeth, a frame, a lever fulcrumed to said frame and connected to said plunger by a cable, a link pivoted to said lever and adapted to engage said teeth, and a pin upon said lever adapted to engage said link and release it from the teeth, substantially as set forth.

4. The combination in a baling device, of a packing-box, a plunger adapted to reciprocate therein, having a bar provided with teeth, a frame, a lever fulcrumed to said frame and connected to said plunger by a cable, a link pivoted to said frame and adapted to also engage said teeth, and a spring connected to said frame and said plunger, substantially as set forth.

In testimony whereof we affix our signatures in presence of two witnesses.

EDWARD W. HILLIARD.
HENRY HEIDACKER.

Witnesses:
THOMAS LIGGETT,
J. A. ORR.